United States Patent [19]
Ochs et al.

[11] Patent Number: 4,775,856
[45] Date of Patent: Oct. 4, 1988

[54] COMPENSATING RESERVOIR FOR A HYDRAULIC BRAKE SYSTEM

[75] Inventors: Wolfgang Ochs, Egelsbach; Winfried Schuetzeichel, Oberursel, both of Fed. Rep. of Germany

[73] Assignee: Alfred Teves GmbH, Frankfurt am Main, Fed. Rep. of Germany

[21] Appl. No.: 79,688

[22] Filed: Jul. 30, 1987

[30] Foreign Application Priority Data

Aug. 2, 1986 [DE] Fed. Rep. of Germany ....... 3626333

[51] Int. Cl.$^4$ ............................................ H01H 35/18
[52] U.S. Cl. ................. 340/624; 200/84 R; 340/59
[58] Field of Search ............. 138/26; 200/84 C, 84 R; 340/59, 624

[56] References Cited

U.S. PATENT DOCUMENTS

| | | | |
|---|---|---|---|
| 2,882,365 | 4/1959 | MacGriff et al. ................ | 200/84 R |
| 4,057,700 | 11/1977 | Nakashima ........................ | 200/84 C |
| 4,458,118 | 7/1984 | Tsubouchi ........................ | 200/84 C |

Primary Examiner—Mark J. Thronson
Attorney, Agent, or Firm—James B. Raden; Robert P. Seitter

[57] ABSTRACT

A compensating reservoir for a hydraulic brake system includes an upper part provided with a fill socket and a lower part which is provided with an outlet. The parts are connected with each other in a liquid-tight manner along a separating or joint line. The fluid chamber, which communicates with a filling and supply opening of a brake master cylinder through the outlet, is subdivided into two chambers by a partition wall and contains an auxiliary chamber with a level indicating float. The auxiliary chamber communicates with the fluid chamber. In order to determine the actual fluid level by a float not arranged in the fluid level's areal center of gravity resulting from the shape of the reservoir, the two chambers hydraulically communicate with each other permanently, with the first chamber containing both the auxiliary chamber and the outlet and with the second chamber being closed in a liquid-tight manner.

6 Claims, 1 Drawing Sheet

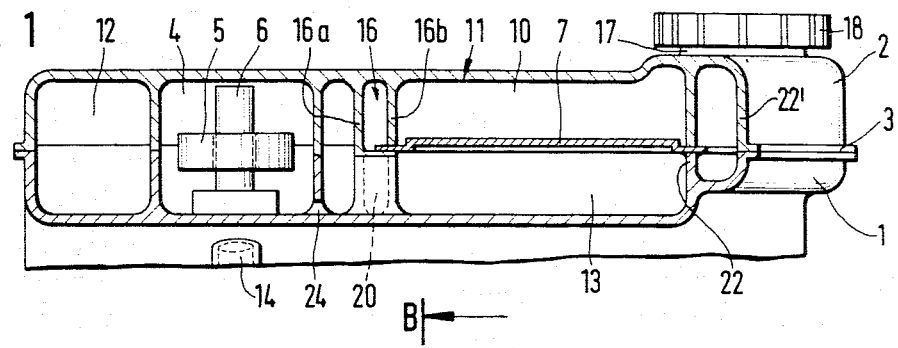
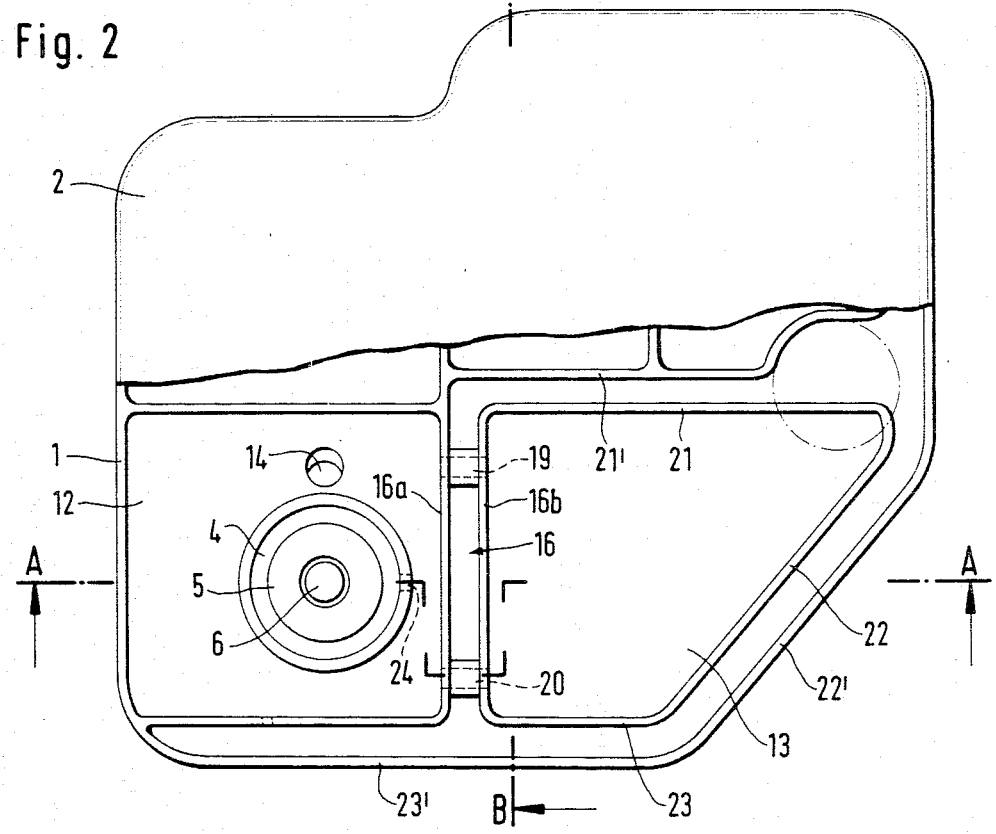
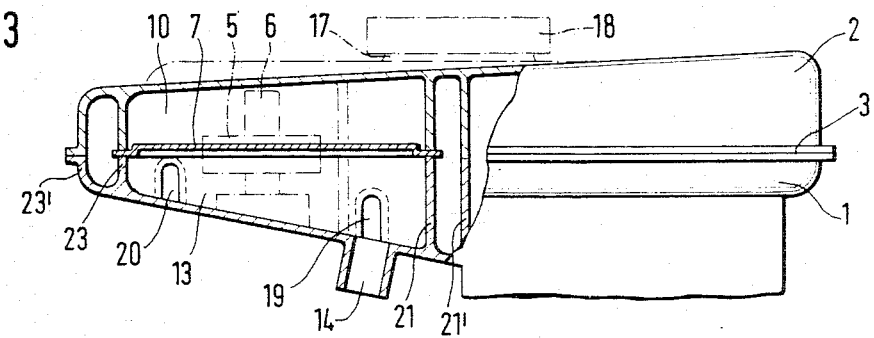

COMPENSATING RESERVOIR FOR A HYDRAULIC BRAKE SYSTEM

BACKGROUND OF THE INVENTION

The present invention relates to a compensating reservoir for a hydraulic brake system. The reservoir consists of an upper part provided with a fill socket and of a lower part provided with an outlet. The upper and lower parts are connected in a liquid-tight manner along a separating line. The reservoir further includes a fluid chamber which communicates with a filling and supply opening of a brake master cylinder via the reservoir outlet. The reservoir also includes an auxiliary chamber which communicates with the fluid chamber and contains a liquid level indicating float device.

A compensating reservoir, for instance, is known from prior German Published Patent Application DE-OS No. 27 20 596. The compensating reservoir disclosed therein has an auxiliary chamber which is formed by a tubular body surrounding a float with a slight play and wherein the cross-section of the outlet end exceeds the cross-section of the fluid connection of the auxiliary chamber towards the remaining compensating reservoir.

A disadvantage of such prior compensating reservoirs, is that it is necessary to arrange the float in the areal center of gravity of the fluid level for the purpose of obtaining optimum accuracy in measuring the fluid level within the reservoir. In these prior reservoirs which, due to their constructional fitting position, have a very shallow and uneven-shaped design, it is extremely difficult to achieve this positioning since the location of the areal center of gravity of the fluid level varies greatly as a consequence of different driving conditions such as during acceleration, deceleration, cornering, uphill and downhill operation.

It is thus an object of the present invention to provide a compensating reservoir of the type referred to above wherein the actual fluid level can be accurately determined by means of a float which is not necessarily arranged in the fluid level's areal center of gravity as a result of the reservoir's shape, and without having to accept considerable losses of fluid.

SUMMARY OF THE INVENTION

According to this invention this object is achieved in that the two chambers communicate hydraulically with each other permanently, with the first chamber containing both the auxiliary chamber and the outlet and with the second chamber being closed in a liquid-tight manner. As a result of this construction, the areal center of gravity of the fluid level is shifted to a desired spot where it is also possible to position the float independent of the shape of the reservoir. Consequently, it is possible to adapt the contour of the reservoir better to the technical fitting conditions of the vehicle, with the usable volume remaining unchanged.

One advantageous embodiment of this invention provides that the second chamber is closed by means of a cover plate welded together with the walls which confine the second chamber, with the cover plate arranged approximately horizontally. This measure enables simplification of the welding operation necessary in the manufacture of the products.

A particularly advantageous embodiment of this invention provides that the cover plate is arranged flush with the reservoir's joint line. This feature results in a further simplification of the manufacturing process as the compensating reservoir according to this invention can be manufactured in one single welding operation.

BRIEF DESCRIPTION OF THE DRAWING

Further features and advantages of this invention will be described in conjunction with the accompanying drawing wherein:

FIG. 1 is a longitudinal cross-sectional view of a compensating reservoir in accordance with the present invention taken along line A—A in FIG. 2;

FIG. 2 is a top view of the compensating reservoir of this invention with the upper part being cut away partially; and FIG. 3 is a sectional view of the inventive compensating reservoir taken along line B—B in FIG. 2.

DETAILED DESCRIPTION

The compensating reservoir illustrated in the drawing consists of a lower part 1 and of an upper part 2 connected with each other, e.g., welded together, in a liquid-tight manner along a separating or joint line 3 extending approximately horizontally in the longitudinal direction. The upper part 2 has a fill socket 17 provided with a screwed thread and closed by a screwed cap 18 and communicating with a fluid chamber 11 within the compensating reservoir. The fluid chamber 11 communicates with a non-illustrated brake master cylinder via an outlet 14. The fluid chamber 11 has a first chamber 12 and a second chamber 13 for the reception of brake fluid which are separated from each other by means of a partition wall 16. For manufacturing reasons, the partition wall 16 is formed by two walls 16a, b extending parallel to each other and formed in one piece both with the lower part 1 and with the upper part 2. Two communication channels 19, 20 passing through the partition wall 16 ensure a permanent hydraulic communication of the two chambers 12, 13. Their function will be explained in more detail hereinafter in connection with the mode of operation of the inventive compensating reservoir.

Additionally provided in the first chamber 12 is an auxiliary chamber 4 which is closed at its lower end by the bottom of the lower part 1 and which permanently communicates with the first chamber 12 via a passage 24. The lower part 1 also carries a guiding device 6 guiding a float 5 in the horizontal direction, said float 5 being equipped with a permanent magnet and cooperating with a non-illustrated reed relay arranged in the cylindrical hollow space of the guiding device 6.

The second chamber 13 is confined by vertically extending walls 21, 22, 23 as can be seen especially from FIG. 2. Said walls 21, 22, 23 are positioned parallel to and spaced from the reservoir's exterior walls 21', 22', 23' of the lower part 1. The second chamber 13 is covered by a cover plate 7 lying approximately horizontally and welded to the walls 16b, 21, 22, and 23 confining the second chamber 13.

The mode of operation of the inventive compensating reservoir will be described in the following, reference being made to FIG. 1. Initially, it should be assumed that the fluid level in the fluid chamber 11 is sufficiently high so that the second chamber 13 which is sealed in a liquid-tight manner is completely filled with brake fluid. Since the fluid in the second chamber 13 cannot move, the areal center of gravity of the fluid level is shifted near or rather onto the vertical axis of the float 5 when the vehicle is driving downhill or uphill, thus an optimum measuring accuracy of the level indicator is achieved.

However, if there is leakage in the brake circuit communicating with the fluid chamber 11 via the outlet 14 at first the fluid level of the first chamber 12 will fall, thereby the reed relay being actuated by the float 5 when the switch point of the level indicator is reached. The fluid level sinking further and falling below the upper edge of either of the communication channels 19, 20, the fluid volume enclosed in the second chamber 13 will flow into the first chamber 12 communicating with the brake circuit via the outlet 14. This measure considerably increases the operational reliability of the hydraulic brake system as a sufficient fluid volume is made available, with the measuring accuracy of the level indicator being increased simultaneously.

What is claimed is:

1. A compensating reservoir for hydraulic brake fluid comprising an upper part and a lower part connected with each other in a liquid tight manner along a joint line to form a fluid chamber, said upper part being provided with a fill socket and said lower part being provided with an outlet for communication with a brake master cylinder, said fluid chamber being subdivided into a first and second chamber, said first chamber having an auxiliary chamber portion formed therein, said auxiliary chamber portion having a level indicating float and communicating with the remaining portion of said first chamber, said second chamber being subdivided into an upper chamber portion which is closed in a liquid tight manner and a lower chamber portion, said lower chamber portion communicating with the remaining portion of said first chamber.

2. The compensating reservoir of claim 3 wherein the second chamber is closed by means of a cover plate welded together with vertically extending walls confining the second chamber.

3. The compensating reservoir of claim 2 wherein the cover plate is arranged approximately horizontally.

4. The compensating reservoir of claim 3 wherein the cover plate is arranged flush with said joint line extending essentially horizontally in the longitudinal direction between said upper and lower parts.

5. The compensating reservoir of claim 2 wherein the walls confining the second chamber are positioned parallel to and are spaced from exterior reservoir walls of said lower part.

6. A compensating reservoir in accordance with claim 1 wherein a cover plate subdivides said second chamber into said upper and lower chamber portions.

* * * * *